(12) United States Patent
Sharma et al.

(10) Patent No.: US 8,626,889 B2
(45) Date of Patent: Jan. 7, 2014

(54) DETECTING ANOMALIES IN A SENSOR-NETWORKED ENVIRONMENT

(75) Inventors: Ratnesh Kumar Sharma, Union City, CA (US); Lola Xiomara Bautista, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 265 days.

(21) Appl. No.: 12/864,206

(22) PCT Filed: Feb. 22, 2008

(86) PCT No.: PCT/US2008/054722
§ 371 (c)(1),
(2), (4) Date: Jul. 22, 2010

(87) PCT Pub. No.: WO2009/105112
PCT Pub. Date: Aug. 27, 2009

(65) Prior Publication Data
US 2010/0299118 A1    Nov. 25, 2010

(51) Int. Cl.
*G06F 15/173* (2006.01)

(52) U.S. Cl.
USPC .......................................... 709/223; 709/224

(58) Field of Classification Search
USPC ................................................... 709/223, 224
See application file for complete search history.

(56) References Cited

U.S. PATENT DOCUMENTS

| 2005/0057370 A1* | 3/2005 | Warrior et al. ........... 340/870.01 |
| 2006/0099971 A1* | 5/2006 | Staton et al. ............... 455/456.6 |
| 2006/0253598 A1 | 11/2006 | Nakamura et al. |

FOREIGN PATENT DOCUMENTS

WO    WO0038039    6/2000

* cited by examiner

*Primary Examiner* — Adnan Mirza

(57) ABSTRACT

In a method for detecting anomalies in a sensor-networked environment, packages of data are received from a plurality of sensors located in the environment. At least one candidate problem location in the environment is identified based upon data contained in the packages. A principal components analysis is performed on the data collected from sensors associated with the identified at least one candidate problem location to identify a number of hidden variables and the number of hidden variables are analyzed to detect anomalies in the environment. In addition, detected anomalies are outputted. An analyzer for performing the method is provided.

21 Claims, 5 Drawing Sheets

DETECTING ANOMALIES IN A SENSOR-NETWORKED ENVIRONMENT

BACKGROUND

Conventional data centers are known to include a number of sensors positioned to detect various conditions at locations of interest in the data centers. The conditions include, for example, temperature, pressure, vibration, humidity, energy consumption, and airflow direction and velocity. The locations of interest have included inlets and outlets of electronics cabinets, inlets and outlets of air conditioning units, and outlets of ventilation tiles.

The sensors have also been networked to a database system to enable constant streaming of data to the database system. The database system often aggregates the streaming data, for instance, to monitor the network of sensors. Conventional database systems often receive massive amounts of streaming data from the sensors, which typically makes the database systems prohibitively slow. Conventional database systems are therefore unable to provide users or other applications immediate responses to changes or anomalies in the data collected by the sensors. This problem is further exacerbated by recent trends to increase the size of data centers and thus, the number of sensors employed to detect conditions in the data centers.

It would thus be beneficial to have the capability to relatively quickly identify changes or anomalies in an environment containing a sensor network.

BRIEF DESCRIPTION OF THE DRAWINGS

Features of the present invention will become apparent to those skilled in the art from the following description with reference to the figures, in which:

FIG. 4 depicts a matrix containing data and timestamps, which is used as an input to a PCA, according to an embodiment of the invention;

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method for detecting anomalies in an environment in a relatively quick and efficient manner and an analyzer configured to perform the method. In one example, the method involves the identification of a number of hidden variables in linear models that approximate a data set. In this example, an anomaly may be deemed to have occurred if the number of hidden variables changes between consecutive iterations of the method.

In another example, the method involves identify principal sensors, which may be defined as those sensors that are the most sensitive to changes in the environment and are thus better indicators of changes in the environment. In this example, the method may employ a reduced set of data supplied by the principal sensors in identifying anomalies to thereby reduce the computational overhead required in performing the method.

Through implementation of the method and analyzer disclosed herein, anomalies, such as, changes in temperature, pressure, airflow volume, energy consumption, etc., detected by a plurality of sensors may quickly and efficiently be analyzed to identify the anomalies.

Figure 1:
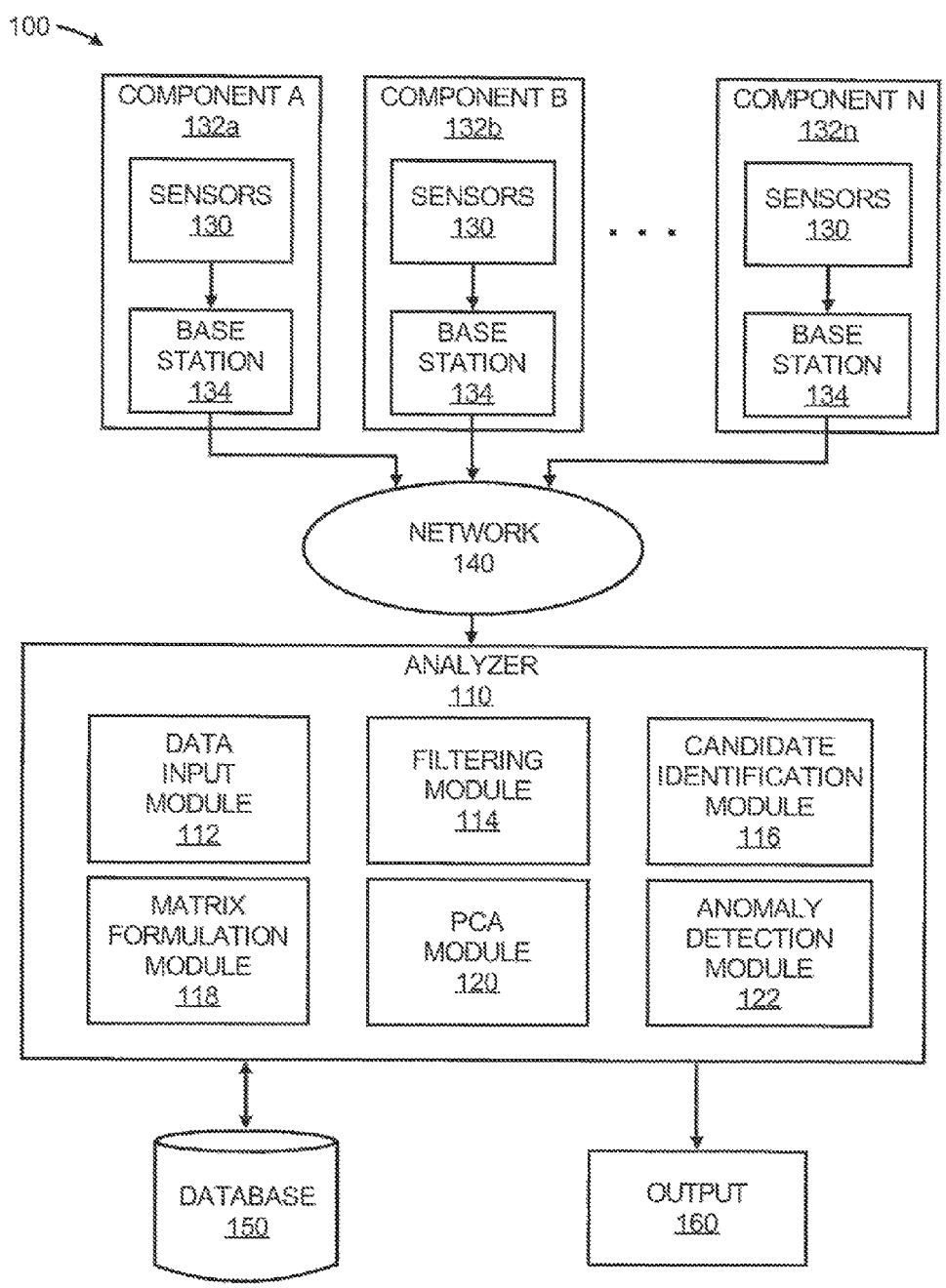
FIG. 1 depicts a simplified block diagram of an environment having an analyzer for detecting anomalies in the environment, according to an embodiment of the invention.

With reference first to FIG. 1, there is shown a simplified block diagram of an environment 100 having an analyzer 110 for detecting anomalies in the environment 100, according to an example. It should be understood that the environment 100 and the analyzer 110 may include additional components and that one or more of the components described herein may be removed and/or modified without departing from a scope of the environment 100 or the analyzer 110.

The environment 100 may comprise any reasonably suitable structure, location, space, etc., in which a plurality of sensors are employed to detect one or more conditions. The environment 100 may also comprise any reasonable suitable structure, location, space, etc., in which data collected from the plurality of sensors are aggregated, for instance, for purposes of data mining, control over cooling systems, etc. Examples of suitable structures, locations, spaces, etc., include an IT data center, a section of an IT data center, a building, a room in a building, etc.

According to an example, the analyzer 110 comprises an apparatus configured to perform various computational processes in the environment 100. In this example, the analyzer 110 comprises, for instance, a microprocessor, an ASIC, a microcontroller, etc. The analyzer 110 may thus comprise a circuit or a processor in a computing device. The analyzer 110 may also comprise a computing device configured to perform the various functions discussed herein below.

According to another example, the analyzer 110 comprises software that is executable by a microprocessor. In this example, the analyzer 110 may be stored, for example, on a memory of a computing device.

In either example, the analyzer 110 is depicted as collecting data from a plurality of sensors 130. The data collected by the sensors 130 may be communicated to the analyzer 110 through a network 140. The network 140 may comprise a wired or wireless communication link between the sensors 130 and the analyzer 110. In this regard, the network 140 may comprise a local area network, a wide area network, the Internet, etc. Although not shown, the analyzer 110, or a computing device containing the analyzer 110, and the sensors 130 may be equipped with hardware and/or software designed to enable transmission of data from the sensors 130 and receipt of data from the sensors 130.

Also shown in FIG. 1 are a plurality of components 132a-132n, where "n" is an integer equal to or greater than one. The components 132a-132n are depicted as including respective ones of the sensors 130. The components 132a-132n may comprise any reasonably suitable components contained in the environment 100 where at least one condition is detected by a plurality of sensors 130.

By way of particular example, the environment 100 comprises an IT data center and the components 132a-132n comprise electronics cabinets in the IT data center. In this example, each of the electronics cabinets may include a plurality of sensors 130 positioned to detect one or more conditions at various locations in respective electronics cabinets. For instance, for a particular electronics cabinet, a plurality of sensors 130 may be configured and positioned to detect inlet and/or outlet temperatures at various heights along the electronics cabinet. As another example, a plurality of sensors 130 may be configured and positioned to detect the volume flow rate of airflow through the electronics cabinet at various heights. As a further example, a plurality of sensors 130 may be configured and positioned to detect energy consumption levels of electronic devices housed in the electronics cabinet.

The components 132a-132n are also depicted as including respective base stations 134. The base stations 134 generally comprise apparatuses configured and positioned to receive data from respective sets of sensors 130 and communicate the data to the analyzer 110. In this regard, the base stations 134 may comprise the hardware and/or software to communicate the data collected by the sensors 130 to the analyzer 110. The base stations 134, however, are considered optional because the sensors 130 may be equipped to directly communicate the sensed data to the analyzer 110. Although not shown, in instances where the base stations 134 are employed, a base station 134 may be configured to receive data from sensors 130 of multiple components 132a-132n and to communicate the data to the analyzer 110.

In any event, the data collected by the sensors 130 may be communicated to the analyzer 110 through implementation of any reasonably suitable data communication protocol over a network.

Generally speaking, the analyzer 110 is configured to analyze the data received from the sensors 130 to identify abnormal sensor responses or anomalies from normal sensor behavior. In addition, the analyzer 110 is configured to identify principal sensors among the sensors 130, which may be defined as those sensors that are the most sensitive to perturbations in the environment 100 and are thus better indicators of changes in the environment 100. According to an example, the analyzer 110 is configured to employ the data received from the principal sensors instead of all of the sensors 130 to thus reduce the amount of data processed in identifying anomalies. In analyzing the data, the analyzer 110 is further configured to identify numbers of hidden variables in sets of linear equations that model the data collected from the sensors 130 to at least a predetermined level of accuracy.

The analyzer 110 is depicted as including a data input module 112, a filtering module 114, a candidate identification module 116, a matrix formulation module 118, a principal components analysis (PCA) module 120, and an anomaly detection module 122. The modules 112-122 may comprise software stored on a computer readable medium or hardware, such as, circuits, or combinations thereof. As described in greater detail herein below, the analyzer 110 may implement or invoke the modules 112-122 to perform the functions discussed above.

In any regard, the analyzer 110 is configured to store the data received from the sensors 130 in a database 150. The analyzer 110 may also access the database 150 to retrieve stored data to identify anomalies in the data streamed from the sensors 130.

The analyzer 110 outputs various representations of either or both of the identified anomalies and principal sensors to one or more outputs 160. The various representations may comprise graphs, plots, or other forms of data representation. According to an example, the output 160 comprises a display upon which a user may view the various representations. In another example, the output 160 comprises a computer readable storage medium on which the various representations may be stored. In a further example, the output 160 comprises a computing device that is connected to the analyzer 110 either locally or over a network. In any of these examples, the outputs of the analyzer 110 may be employed to dynamically monitor various resources, such as cooling and power resources, in the environment 100. The outputs may also be employed in controlling the various resources.

Figure 2:
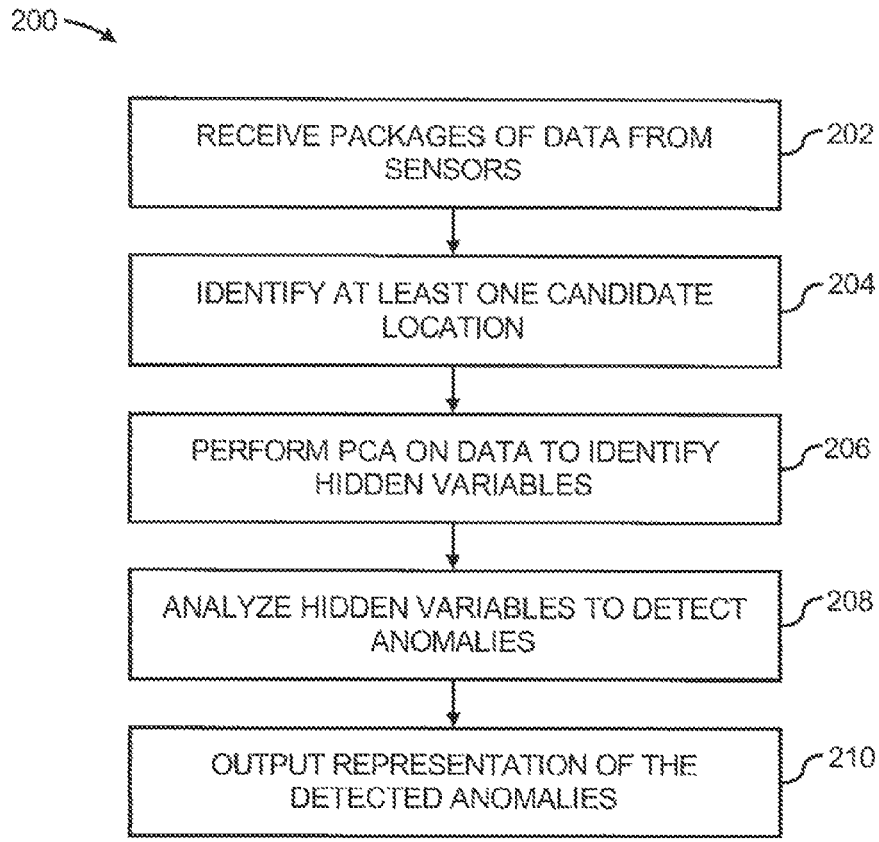
FIG. 2 shows a flow diagram of a method for detecting anomalies in an environment, according to an embodiment of the invention.

Turning now to FIG. 2, there is shown a flow diagram of a method 200 for detecting anomalies in an environment, according to an example. It should be understood that the method 200 may include additional steps and that one or more of the steps described herein may be removed and/or modified without departing from a scope of the method 200.

The description of the method 200 is made with reference to the environment 100 depicted in FIG. 1 and thus makes particular reference to the elements contained in the environment 100. It should, however, be understood that the method 200 may be implemented in an environment that differs from the environment 100 without departing from a scope of the method 200.

Generally speaking, the analyzer 110 may implement the method 200 to detect anomalies in an environment 100 in a relatively quick and efficient manner. In one regard, the analyzer 110 is configured to relatively quick detect changes occurring at one or more locations in the environment 100 by identifying principal sensors at the one or more locations. In another regard, the analyzer 110 is configured to identify the principal sensors in a relatively quick and efficient manner by identifying sets of linear equations that model the data.

With particular reference again to FIG. 2, at step 202, the analyzer 110 implements or invokes the data input module 112 to receive packages of data from the sensors 130. As described above, the analyzer 110 may receive the data packages directly from the sensors 130 or through one or more base stations 134.

At step 204, the analyzer 110 implements or invokes the candidate identification module 116 to identify one or more candidate problem locations in the environment 100 from the data contained in the data packages. The candidate problem locations may be defined as those locations in the environment 100 in which one or more sensors 130 have detected at least one condition that is outside of a normal condition. Manners in which the candidate problem locations may be identified are described in greater detail herein below with respect to the method 300.

At step 206, the analyzer 110 implements or invokes the principal components analysis (PCA) module 120 to perform a PCA on the data collected from sensors 130 associated with the candidate problem locations to identify a number of hidden variables. As is generally known, PCA is a technique for reducing multidimensional data sets to lower dimensions to simplify analysis of the data sets. PCA has been used as a tool in exploratory data analysis for making predictive models. Again, various manners in which the analyzer 110 performs the PCA on the data is described in greater detail with respect to the method 300.

At step 208, the analyzer 110 implements or invokes the anomaly detection module 122 to analyze the number of hidden variables identified at step 206 for at least one of the candidate locations identified at step 204 to detect anomalies in the data. More particularly, for instance, the analyzer 110 determines whether the number of hidden variables changes during consecutive time windows and a change in the number of hidden variables from a norm may be determined as an indication of the existence of an anomaly.

At step 210, the analyzer 110 outputs a representation of the detected anomalies to one or more outputs 160.

According to an example, at step 210, the analyzer 110 may further analyze the data received from the plurality of sensors to determine whether the data received from any one of the plurality of sensors is substantially correlated with the data received from any of the other sensors of the plurality of sensors. By way of example, the analyzer 110 may analyze the correlations between the data in instances when identification of sensors 130 having similar response characteristics is desired.

Figure 3:
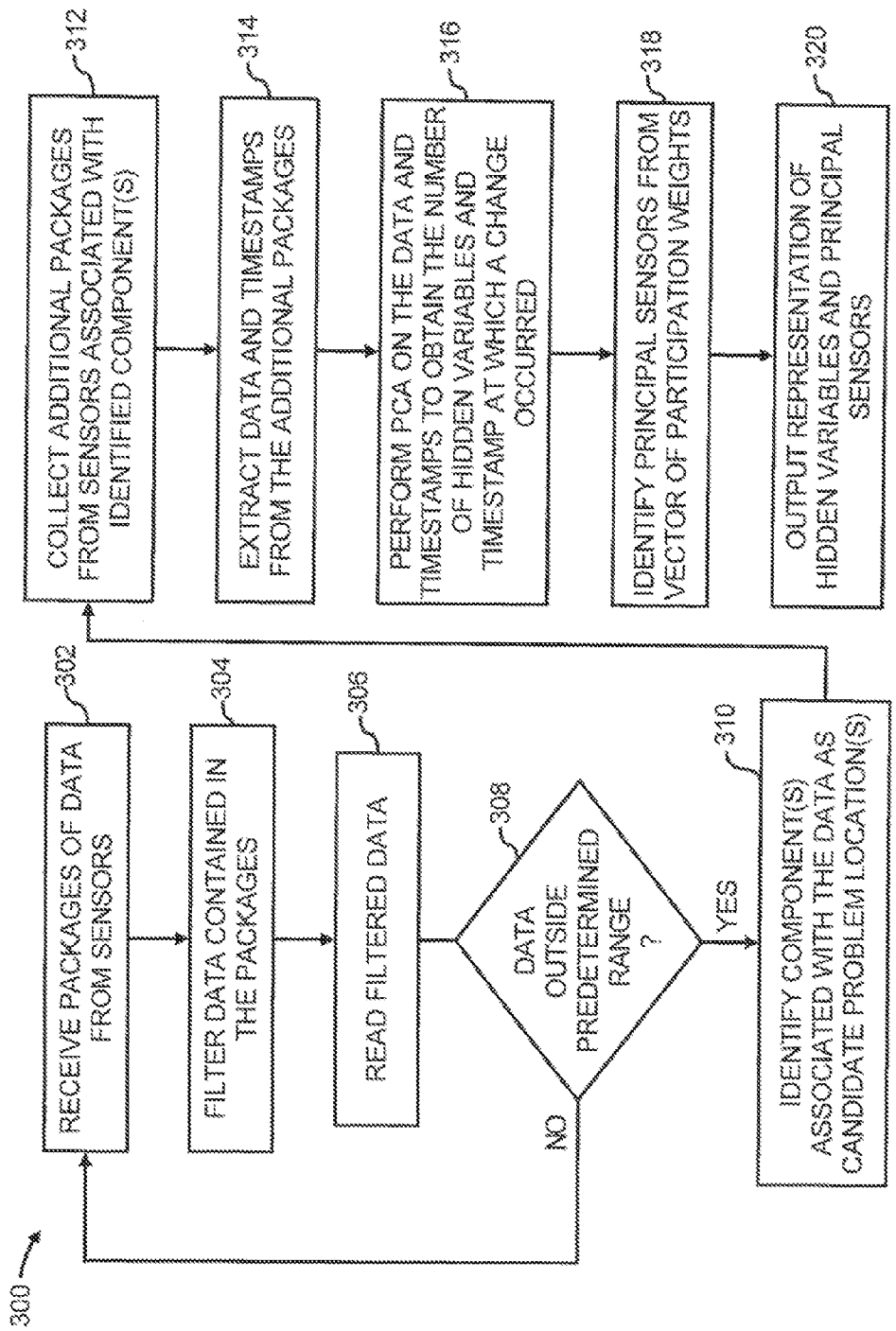
FIG. 3 shows a flow diagram of a method for detecting anomalies in an environment, which is a more detailed illustration of the method depicted in FIG. 2, according to an embodiment of the invention.

With reference now to FIG. 3, there is shown a flow diagram of a method 300 for detecting anomalies in an environment, which is a more detailed illustration of the method 200 depicted in FIG. 2, according to an example. It should be understood that the method 300 may include additional steps and that one or more of the steps described herein may be removed and/or modified without departing from a scope of the method 300.

At step 302, the analyzer 110 implements or invokes the data input module 112 to receive packages of data from the sensors 130. In addition, the analyzer 110 implements or invokes the filtering module 114 to filter the data contained in the packages at step 304. More particularly, at step 304, the filtering module 114 is configured to implement a conventional filtering technique to substantially eliminate data due to random variations or noise in the data.

At step 306, the analyzer 110 reads the filtered data. In addition, at step 308, the analyzer 110 invokes or implements the candidate identification module 116 to determine whether the filtered data falls outside of a predetermined threshold range. That is, whether each of the filtered data either exceeds an upper limit of the predetermined range or falls below a lower limit of the predetermined range. The predetermined range may be set according to a level of granularity desired in identifying candidate problem locations. That is, for instance, the predetermined range may be made smaller in order to capture larger numbers of candidate problem locations.

In addition, the predetermined range may be set based upon the type of data that is collected by the sensors 130. In an example where the data collected is temperature, the predetermined range may comprise a nominal range of allowable temperatures at the inlets of the components 132a-132n. As another example, where the data collected is energy consumption, the predetermined range may comprise a nominal range of allowable energy consumption levels of electronic devices contained in the components 132a-132n.

In any regard, the analyzer 110 may continue to receive packages from those sensors 130 that supplied the filtered data that have been found to be within the predetermined range at step 302. In addition, the analyzer 110 may repeat steps 304-308 on that new data received at step 302.

For those sensors 130 that supplied filtered data that have been found to fall outside of the predetermined range, the analyzer 110 identifies the components 132a-132n to which those sensors 130 are associated and identifies those components 132a-132n as candidate problem locations, as indicated at step 310. The analyzer 110 identifies those components 132a-132n as candidate problem locations because at least one condition in or around these components 132a-132n has been identified at step 308 as being outside of a normal condition.

At step 312, the analyzer 110 invokes or implements the data input module 112 to collect additional packages of data from the sensors 130 associated with the components 132a-132n identified as candidate problem locations. By way of example, the analyzer 110 receives approximately 100 packages of data from each of the associated sensors 130.

At step 314, the analyzer 110 extracts the data and timestamps at which the data were collected from the additional packages collected at step 312. According to an example, the analyzer 110 invokes or implements the matrix formulation module 118 to arrange the data and timestamps in a matrix X. An example of a matrix 400 formed from the data and timestamps is depicted in FIG. 4. In the matrix 400, $X_n$ denotes the sensor 130 associated with respective components 132a-132n, T1-T5 denote the sensed data, and t denotes the timestamp at which the data was collected.

At step 316, the analyzer 110 invokes or implements the PCA module 120 to analyze the data contained in the matrix X. An example of a manner in which the PCA module 120 may be implemented to identify the number of hidden variables contained in a linear transform that is used to reconstruct the data contained in the matrix X is depicted in the flow diagram of the method 500 in FIG. 5.

Figure 5:
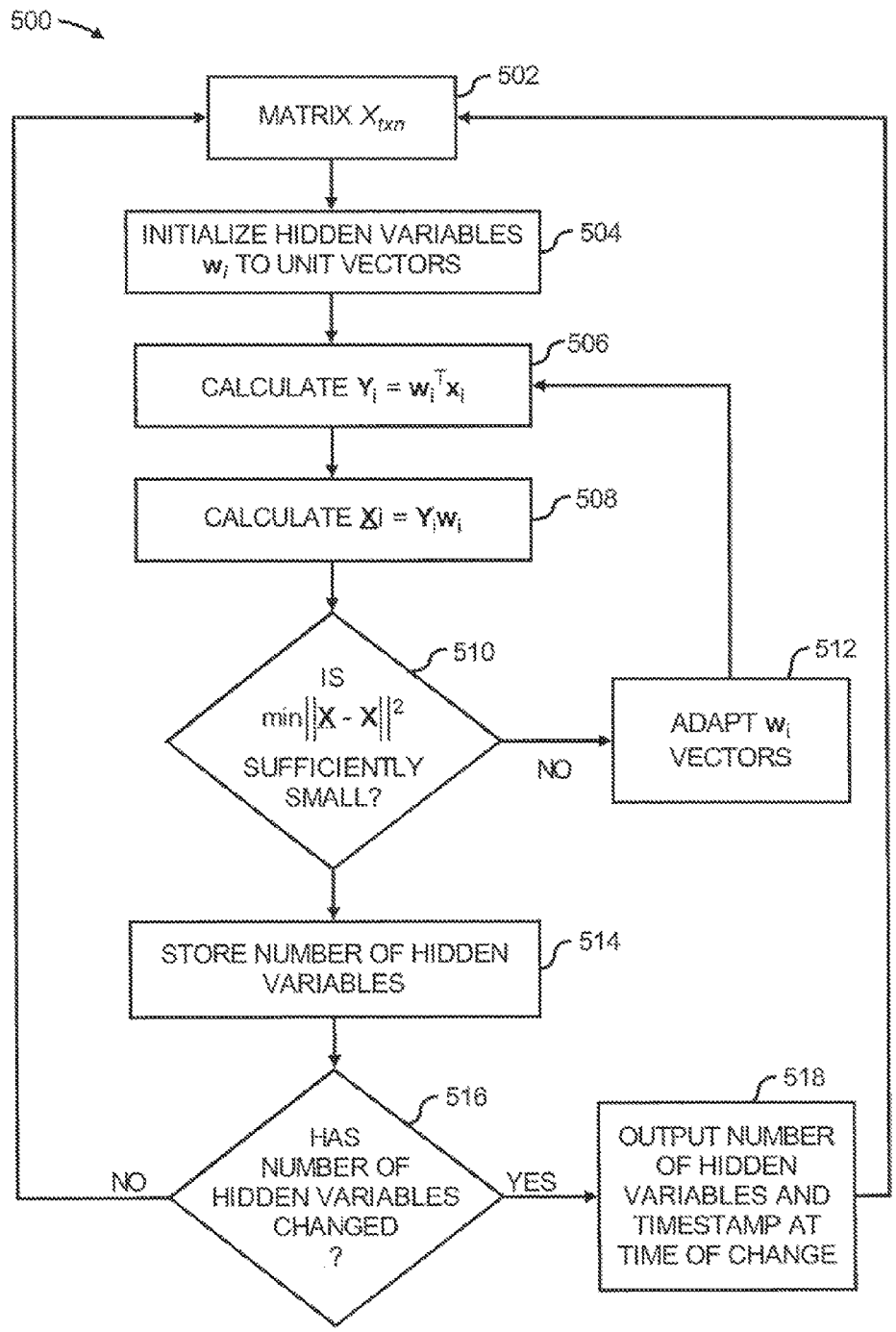
FIG. 5 shows a flow diagram of a method for performing a PCA to obtain a number of hidden variables and a timestamp at which a change in a detected condition occurred, according to an embodiment of the invention.

With particular reference to FIG. 5, at step 502, the matrix X is inputted into the PCA module 120. At step 504, the analyzer 110 initializes the hidden variables $w_i$ to be unit vectors. In addition, at step 506, the analyzer 110 calculates a matrix Y, which is a transformation of the principal components of the data, through the following equation:

$$Y_i = w_i^T x_i \qquad \text{Equation (1)}$$

At step 508, the analyzer 110 calculates a matrix $\underline{X}$, which generally comprises a reconstruction of the X matrix, through the following equation:

$$\underline{X}_i = Y_i w_i \qquad \text{Equation (2)}$$

At step 510, the analyzer 110 calculates a difference between the reconstructed matrix $\underline{X}$ and the original matrix X and determines whether the difference is sufficiently small. By way of example, the difference may be considered to be sufficiently small if the reconstructed matrix $\underline{X}$ is at least about 95% of the original matrix X. In other words, the difference is considered as being sufficiently small if the model calculated at step 506 is at least about 95% accurate.

If the analyzer 110 determines that the difference is not sufficiently small at step 510, the analyzer 110 adapts the hidden variable $w_i$ vectors at step 512. In addition, the analyzer 110 repeats steps 506-512 until a linear model that approximates the original matrix X is identified to at least a minimum degree of accuracy.

Once the analyzer 110 determines that such a linear model has been found at step 510, the analyzer 110 stores the number of hidden variables $w_i$ contained in the linear model, as indicated at step 514. In addition, at step 516, the analyzer 110 invokes or implements the anomaly detection module 122 to compare the number of hidden variables stored at step 514 with any previously stored number of hidden variables to determine whether the number of hidden variables has changed. In addition, or alternatively, the analyzer 110 compares the stored number of hidden variables with a nominal number of hidden variables, for instance, as determined through testing, to determine whether the stored number of hidden variables has changed from the nominal number of hidden variables.

If the analyzer 110 determines that the number of hidden variables has not changed or that the number of hidden variables has not changed from the nominal number of hidden variables, the analyzer 110 repeats steps 502-516 to substantially continuously monitor the conditions detected in the environment 100. However, if the analyzer 110 determines that the number of hidden variables has changed or that the number of hidden variables has changed from the nominal number of hidden variables, the analyzer 110 outputs the number of hidden variables and a timestamp at which the change occurred at step 518. In other words, when a change in the number of hidden variables occurs, the analyzer 110 determines that there is an anomaly in the sensed data. Generally speaking, an increase in the number of hidden variables is an indication that the total energy of the reconstructed matrix $\bar{X}$ is higher than the total energy of the original matrix X and that there was an anomaly. A decrease in the number of hidden variables is an indication that the conditions in the environment 100 are returning to a normal state.

Following step 518, the analyzer 110 repeats steps 502-518 to continue tracking the environment 100 for anomalies.

With reference back to FIG. 2, at step 318, the analyzer 110 identifies the principal sensors from a vector of participation weights contained in the reconstructed matrix $\bar{X}$. More particularly, for instance, the principal sensors comprise those sensors having the greatest values in the columns of the reconstructed matrix $\bar{X}$ because the matrix of weights is ordered by the significance of the principal components. In addition, the position of the sensor 130 is related to the position of the sensor data in the matrix X. As such, the principal sensors, that is, those sensors having the most significance in the PCA, are identified based upon the positions of their weights in the reconstructed matrix $\bar{X}$. By way of example, those sensors 130 that detect the greatest number of changes may comprise the principal sensors.

At step 320, the analyzer 110 outputs a representation of the hidden variables identified at step 316 and may also output the principal sensors identified at step 318. The representation of the hidden variables may comprise, for instance, a plot of a time series and bar plots for the numbers of hidden variables identified during consecutive iterations of the method 500.

In addition, although not shown, the analyzer 110 may employ the principal sensors in future implementations of the methods 300 and 500 as core sensor groups. In other words, instead of analyzing data streaming from all of the sensors 130, the analyzer 110 may substantially limit the analysis performed in the methods 300 and 500 to the data received from the principal sensors to thereby substantially reduce the amount of data processed and thus expediting the detection of anomalies in the environment 100.

Some or all of the operations set forth in the methods 200, 300, and 500 may be contained as one or more utilities, programs, or subprograms, in any desired computer accessible or readable medium. In addition, the methods 200, 300, and 500 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
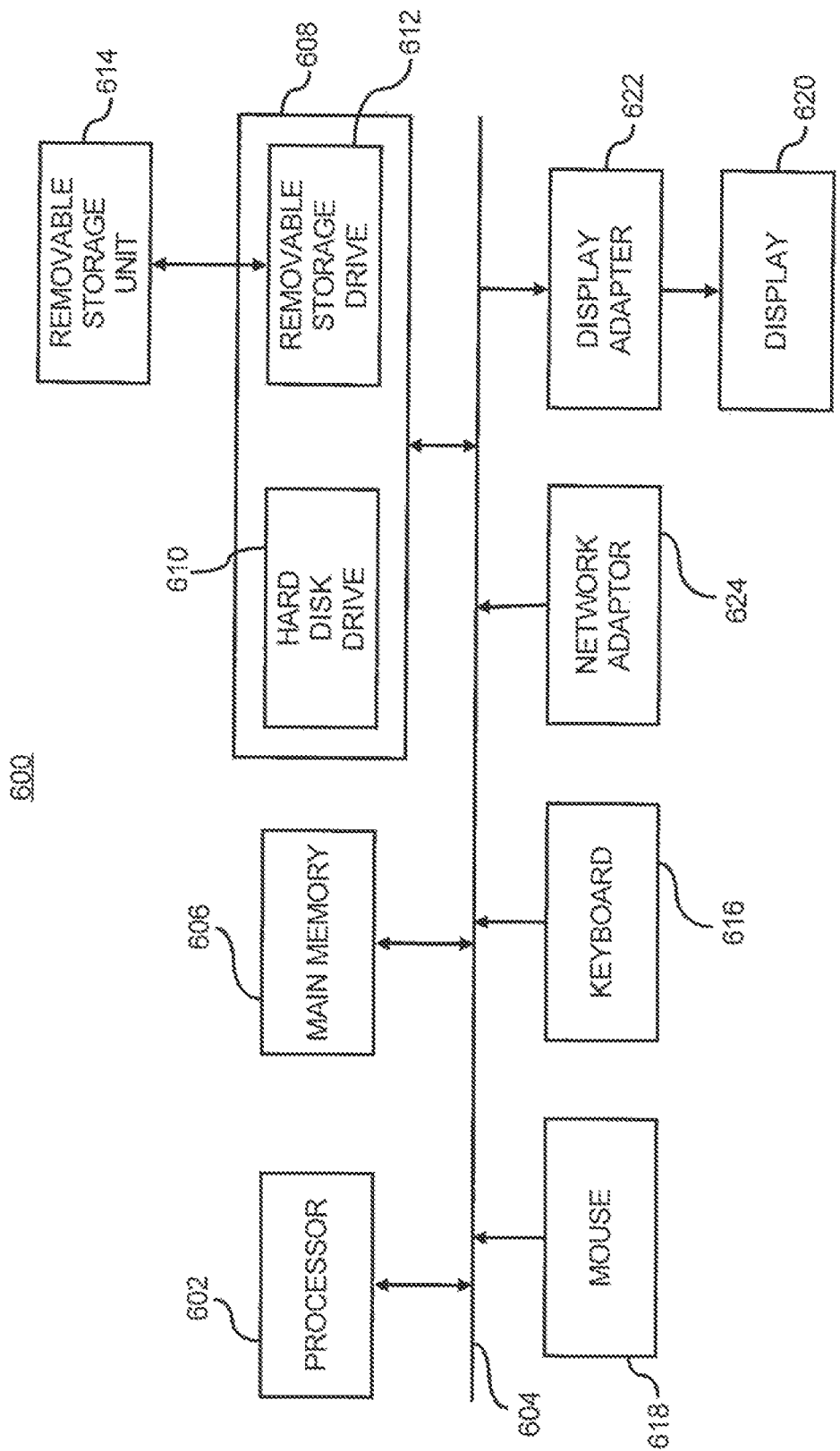
FIG. 6 illustrates a computer system, which may be employed to perform various functions of the analyzer depicted in FIG. 1 in performing some or all of the steps contained in the diagrams depicted in FIGS. 2, 3, and 5, according to an embodiment of the invention.

FIG. 6 illustrates a computer system 600, which may be employed to perform the various functions of the analyzer 110 described herein above with, according to an example. In this respect, the computer system 600 may be used as a platform for executing one or more of the functions described hereinabove with respect to the analyzer 110.

The computer system 600 includes a processor 602, which may be used to execute some or all of the steps described in the methods 200, 300, and 500. Commands and data from the processor 602 are communicated over a communication bus 604. The computer system 600 also includes a main memory 606, such as a random access memory (RAM), where the program code may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for detecting anomalies in an environment may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a conventional "white box" server or computing device, etc. Also, one or more of the components in FIG. 6 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for detecting an anomaly in a sensor-networked environment, said method comprising:
   receiving packages of data from a plurality of sensors located in the environment;
   identifying at least one candidate problem location in the environment based upon data contained in the packages;
   performing a principal components analysis on the data contained in the packages received from a subset of the plurality of sensors associated with the identified at least one candidate problem location to identify a number of hidden variables derived from a set of linear models that approximate the data contained in the packages; and analyzing, by a processor, the number of hidden variables to detect an anomaly in the environment.

2. The method according to claim 1, further comprising: filtering noise from the data contained in the packages prior to identifying at least one candidate problem location.

3. The method according to claim 1, wherein identifying at least one candidate problem location further comprises:
determining whether each of the data contained in the packages is outside of a predetermined range;
for each of the data determined to be outside of the predetermined range, determining the sensor from which the data originated; and
identifying the location where the sensor is located as the at least one candidate problem location.

4. The method according to claim 1, wherein the environment comprises a data center housing a plurality of racks having inlets and outlets, and wherein the plurality of sensors are to detect temperatures at one or both of the inlets and outlets of the racks, and wherein the step of identifying at least one candidate problem location further comprises identifying at least one candidate problem rack from the detected temperatures.

5. The method according to claim 1, wherein the environment comprises a data center housing a plurality of racks containing electronic devices, and wherein the plurality of sensors are to detect energy consumption levels of the electronic components, and wherein the step of identifying at least one candidate problem location further comprises identifying at least one candidate problem rack from the detected energy consumption levels.

6. The method according to claim 1, further comprising: collecting additional packages from the subset of the plurality of sensors prior to performing the principal components analysis.

7. The method according to claim 6, wherein collecting additional packages further comprises collecting around 100 additional packages from the subset of the plurality of sensors.

8. The method according to claim 6, further comprising:
repeating the steps of collecting additional packages from the subset of the plurality of sensors and performing a principal components analysis on the additional packages to identify a second number of hidden variables; and
wherein analyzing the number of hidden variables further comprises comparing the number of hidden variables with the second number of hidden variables.

9. The method according to claim 8, wherein analyzing the number of hidden variables further comprises determining that an anomaly exists when the second number of hidden variables varies with respect to at least one of the number of hidden variables and a nominal number of hidden variables.

10. The method according to claim 6, wherein the number of hidden variables is derived from a set of linear models that approximate the data from the additional packages, wherein performing the principal components analysis further comprises:
determining whether a difference in the set of linear models and the data from the additional packages is within a predetermined error level; and
adapting the number of hidden variables and recalculating the set of linear models in response to the difference exceeding the predetermined error level.

11. The method according to claim 6, wherein performing the principal components analysis further comprises:
constructing an original matrix of the data contained in the additional packages;
calculating a reconstructed matrix from the original matrix, wherein the reconstructed matrix comprises a plurality of participation weights; and
identifying one or more principal sensors from the plurality of participation weights in the reconstructed matrix.

12. The method according to claim 11, further comprising:
performing another principal components analysis using data received only from the identified one or more principal sensors to identify the number of hidden variables.

13. The method according to claim 1, further comprising:
analyzing the data received from the plurality of sensors to determine whether the data received from any one of the plurality of sensors is substantially correlated with the data received from any of the other sensors of the plurality of sensors.

14. An analyzer for detecting an anomaly in an environment, said analyzer comprising:
a data input module for receiving packages of data from a plurality of sensors located in the environment;
a candidate identification module for identifying at least one candidate problem location in the environment based upon data contained in the packages;
a principal components analysis module for performing a principal components analysis on the data contained in the packets received from a subset of the plurality of sensors associated with the identified at least one candidate problem location to identify a number of hidden variables derived from a set of linear models that approximate the data contained in the packages; and
an anomaly detection module for detecting an anomaly in the environment from an analysis of the number of hidden variables.

15. The analyzer according to claim 14, further comprising:
a filtering module for filtering noise from the data contained in the packages.

16. The analyzer according to claim 14, wherein the candidate identification module is further to determine whether each of the data contained in the packages is outside of a predetermined range and for each of the data determined to be outside of the predetermined range, to determine the sensor from which the data originated, and to identify the location where the sensor is located as the at least one candidate problem location.

17. The analyzer according to claim 14, wherein the environment comprises a data center housing a plurality of racks having inlets and outlets, and wherein the plurality of sensors are to detect temperatures at one or both of the inlets and outlets of the racks, and the candidate identification module is further to identify the at least one candidate problem rack from the detected temperatures.

18. The analyzer according to claim 14, wherein the data input module is to receive additional packages from the subset of the plurality of sensors, wherein the principal components analysis module is further to perform additional analyses on the additional packages to identify a second number of hidden variables, and wherein the anomaly detection module is further to determine that an anomaly exists when the second number of hidden variables differs from at least one of the number of hidden variables and a nominal number of hidden variables.

19. The analyzer according to claim 18, wherein the number of hidden variables is derived from a set of linear models that approximate the data from the additional packages, and wherein the principal components analysis module is further to determine whether a difference in the set of linear models and the data from the additional packages is within a predetermined error level and to adapt the number of hidden variables and recalculate the set of linear models in response to the difference exceeding the predetermined error level.

20. The analyzer according to claim 18, wherein the principal components analysis module is further to construct an original matrix of the data contained in the additional packages, to calculate a reconstructed matrix from the original matrix, wherein the reconstructed matrix comprises a plurality of participation weights, identify one or more principal sensors from the plurality of participation weights in the reconstructed matrix, and to perform another principal components analysis using data received only from the identified one or more principal sensors to identify the number of hidden variables.

21. A non-transitory computer readable storage medium on which is embedded one or more computer programs, said one or more computer programs implementing a method for or detecting an anomaly in an environment, said one or more computer programs comprising computer readable code to:
receive packages of data from a plurality of sensors located in the environment;
identify at least one candidate problem location in the environment based upon data contained in the packages;
perform a principal components analysis on the data contained in the packets received from a subset of the plurality of sensors associated with the identified at least one candidate problem location to identify a number of hidden variables derived from a set of linear models that approximate the data contained in the packages; and
analyze the number of hidden variables to detect an anomaly in the environment.

* * * * *